United States Patent
Kawamoto

(10) Patent No.: US 11,190,708 B2
(45) Date of Patent: Nov. 30, 2021

(54) INFORMATION PROCESSING APPARATUS HAVING CAPABILITY OF APPROPRIATELY SETTING REGIONS DISPLAYED WITHIN AN IMAGE CAPTURING REGION USING DIFFERENT CATEGORIES

(71) Applicant: CANON KABUSHIKI KAISHA, Tokyo (JP)

(72) Inventor: Tomohiro Kawamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/655,105

(22) Filed: Oct. 16, 2019

(65) Prior Publication Data

US 2020/0128192 A1 Apr. 23, 2020

(30) Foreign Application Priority Data

Oct. 22, 2018 (JP) .............................. JP2018-198706

(51) Int. Cl.
*H04N 5/243* (2006.01)
*G06F 3/0482* (2013.01)
*G06F 3/0484* (2013.01)
*G06T 7/90* (2017.01)

(52) U.S. Cl.
CPC ........... *H04N 5/243* (2013.01); *G06F 3/0482* (2013.01); *G06F 3/04842* (2013.01); *G06F 3/04845* (2013.01); *G06T 7/90* (2017.01)

(58) Field of Classification Search
CPC ............... H04N 5/243; H04N 21/8153; H04N 21/234318; H04N 7/18; H04N 9/64; G06F 3/0482; G06F 3/04845; G06F 3/04842; G06T 7/90; G06T 11/00
See application file for complete search history.

(56) References Cited

U.S. PATENT DOCUMENTS

| | | | |
|---|---|---|---|
| 2007/0183657 A1* | 8/2007 | Kidono .............. | H04N 9/04553 382/162 |
| 2007/0257915 A1* | 11/2007 | Kutaragi ................. | G06T 19/00 345/427 |
| 2011/0279698 A1* | 11/2011 | Yoshikawa ............ | H04N 5/332 348/222.1 |
| 2014/0040831 A1* | 2/2014 | Akasaka ............... | G06F 3/0482 715/841 |
| 2015/0145996 A1* | 5/2015 | Watanabe ................. | G06T 5/50 348/148 |

FOREIGN PATENT DOCUMENTS

JP          2016186555 A      10/2016

* cited by examiner

*Primary Examiner* — Luong T Nguyen
(74) *Attorney, Agent, or Firm* — Carter, DeLuca & Farrell LLP

(57) ABSTRACT

An information processing apparatus which accepts designation of a first image category from among a plurality of image categories including a visible light image, an infrared light image, and a composite image, accepts designation of a second image category different from the first image category from among the plurality of image categories, displays an image of the accepted first image category in a display region of a display unit, and accepts designation of a region in the image of the first image category displayed in the display region, wherein an image of the accepted second image category is displayed in the accepted region.

15 Claims, 7 Drawing Sheets

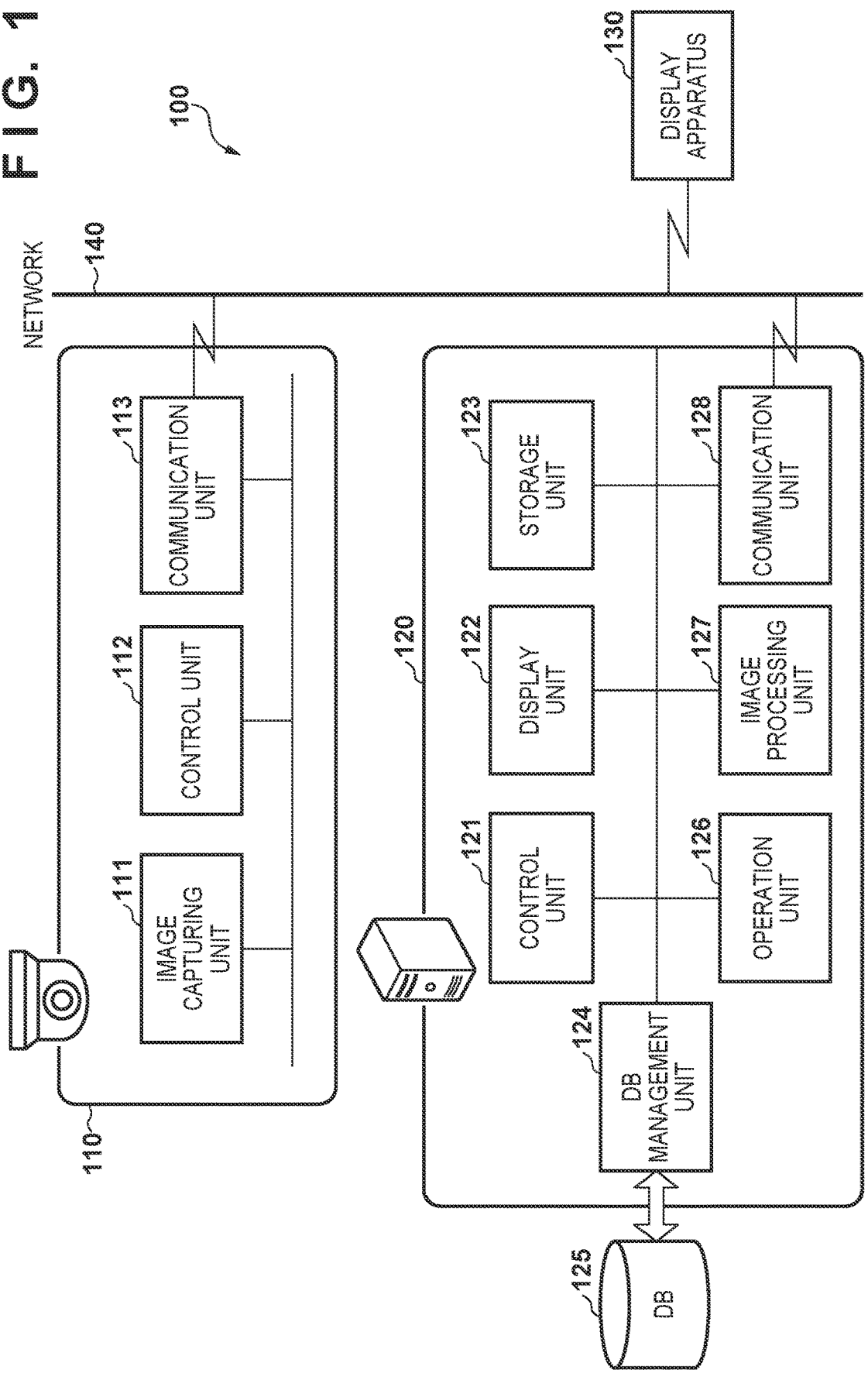

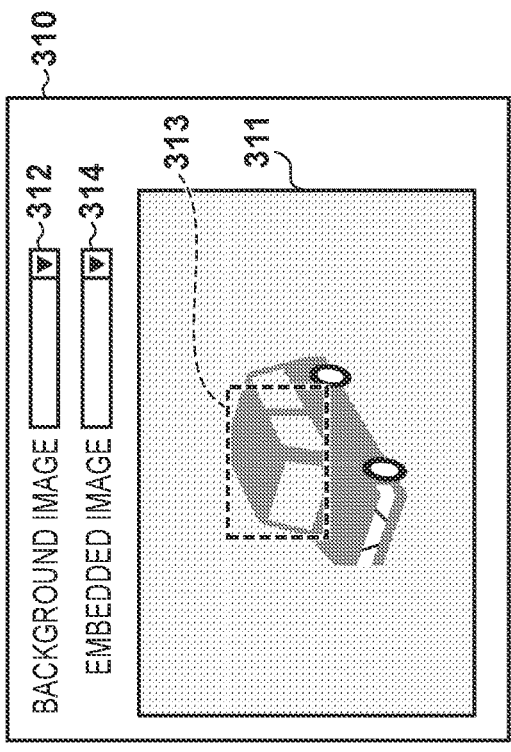
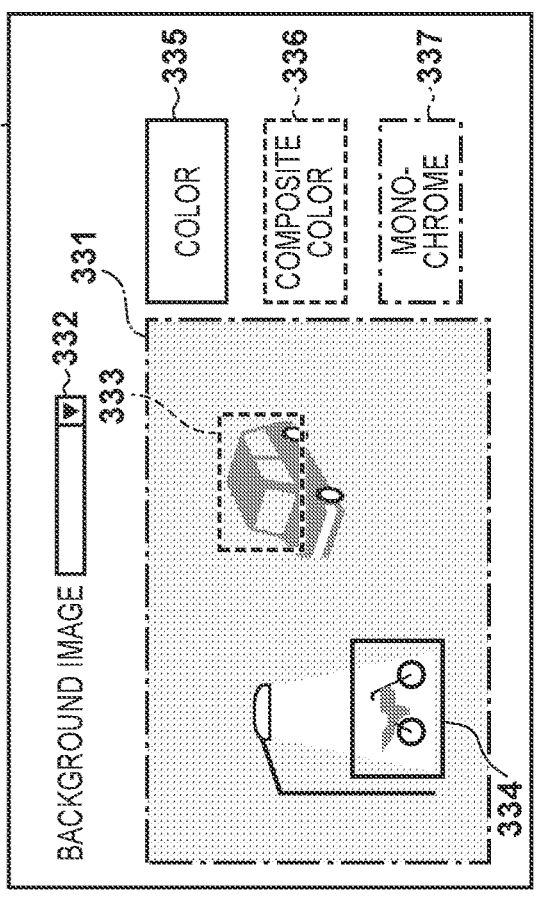
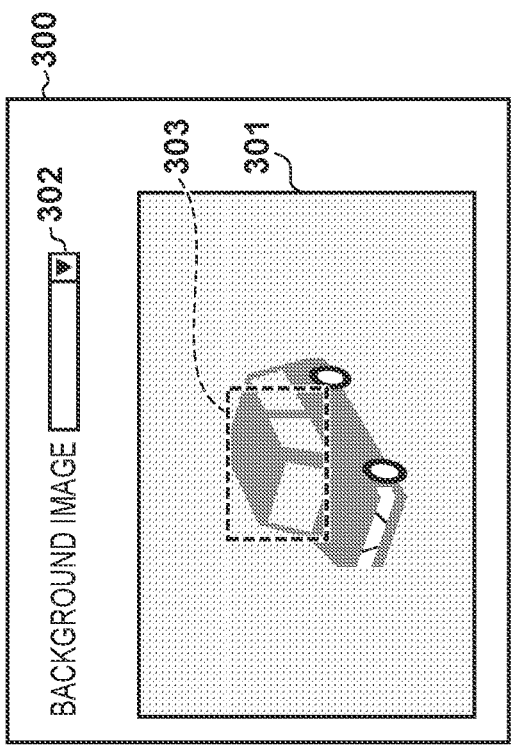
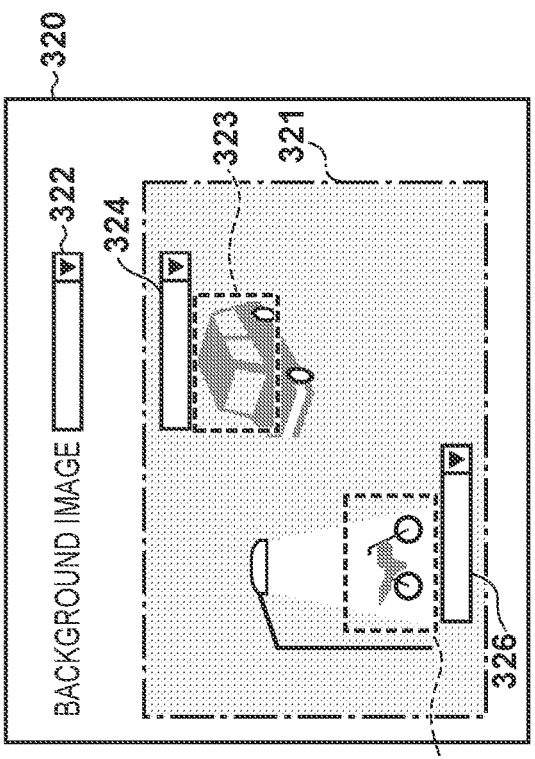

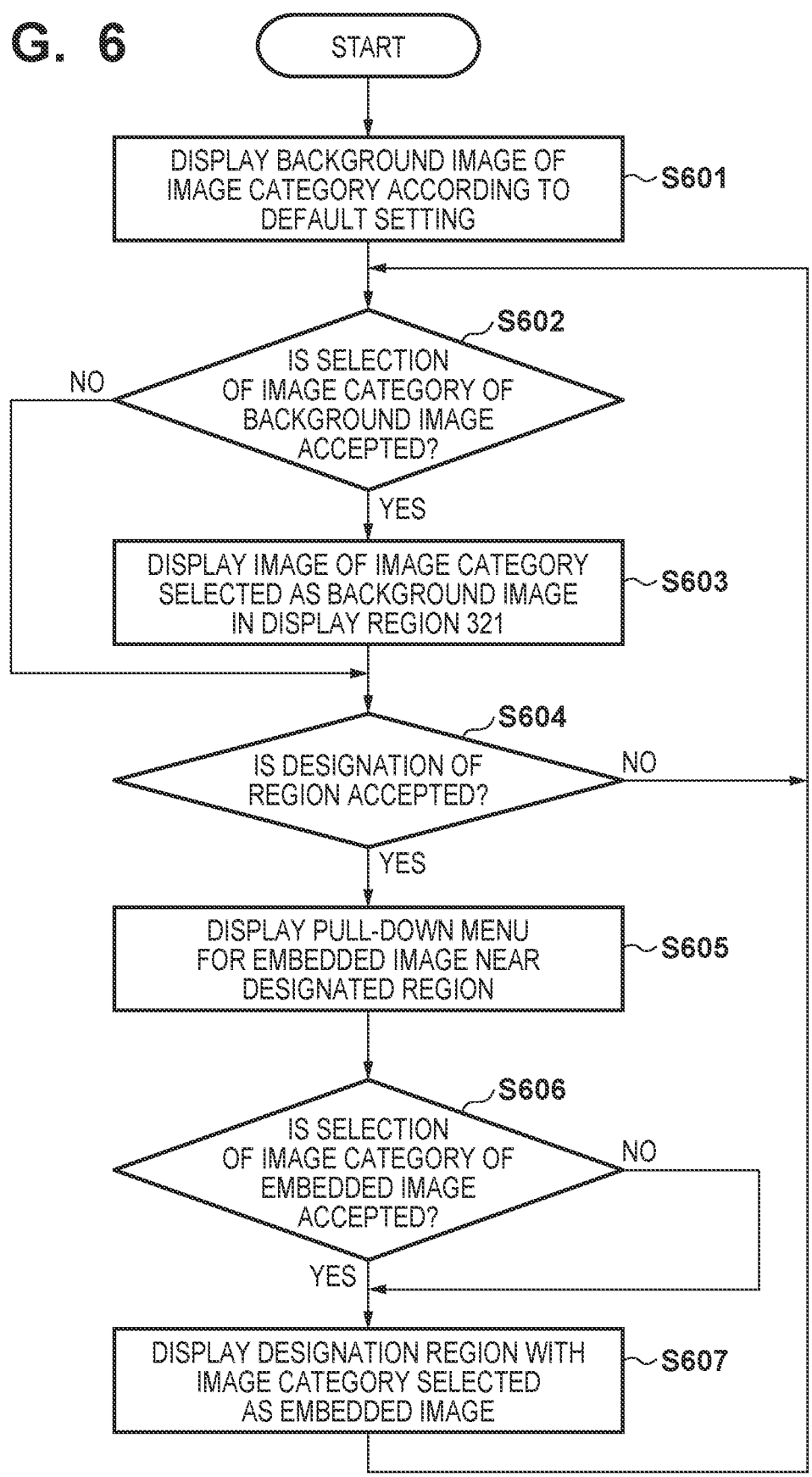

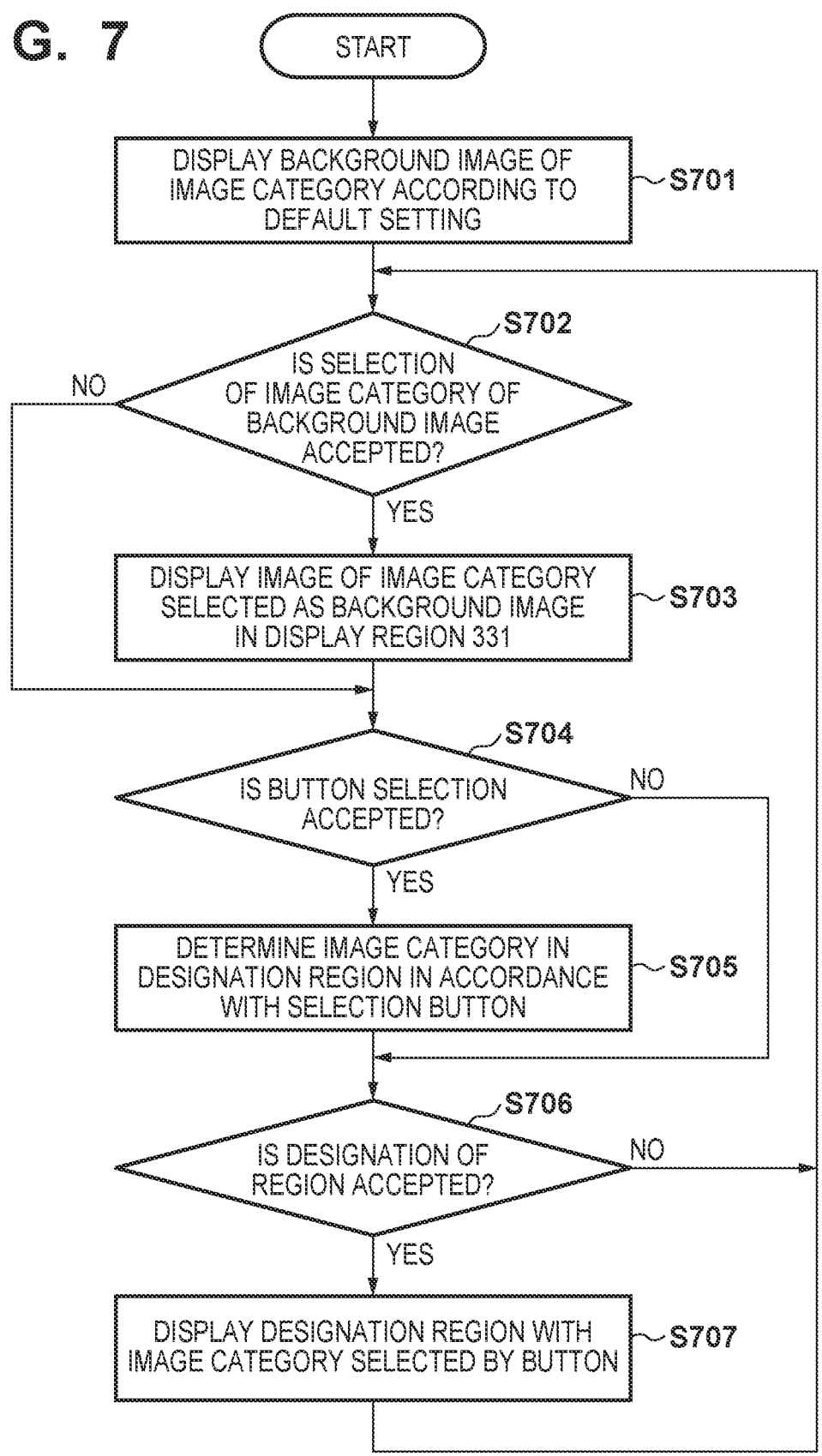

INFORMATION PROCESSING APPARATUS HAVING CAPABILITY OF APPROPRIATELY SETTING REGIONS DISPLAYED WITHIN AN IMAGE CAPTURING REGION USING DIFFERENT CATEGORIES

BACKGROUND OF THE INVENTION

Field of the Invention

The present disclosure relates to an information processing apparatus, a control method for the information processing apparatus, and a storage medium.

Description of the Related Art

Among shooting apparatuses, some apparatuses have an image sensor that can obtain a color image and an image sensor that can obtain a monochrome image, and are capable of displaying a "color image", a "monochrome image", and also a "composite color image" obtained by compositing a color image and a monochrome image.

Also, there is a method in which, with use of an image captured by a shooting apparatus, a partial region of a color image is displayed as a monochrome image, or a partial region of a monochrome image is displayed as a color image. Japanese Patent Laid-Open No. 2016-186555 discloses a method in which only a partial region of one of a monochrome image and a color (visible) image is extracted, and the extracted partial region is displayed superimposed on the other image. A method is disclosed that realizes a peaking function by displaying an outline of an object displayed in a monochrome image as a color image.

With the above-described shooting apparatus, a composite color image can be displayed even in a dark place (a place with insufficient illuminance) in which only a monochrome image was able to be displayed conventionally, and the convenience of a user can be improved. However, when this shooting apparatus is used for a monitoring purpose, there is a risk that a significant brightness difference arises within an image capturing region; for example, in night-time shooting, it is plausible that a range that is reached by a street light is bright whereas a range that is not reached by the street light is dark.

SUMMARY OF THE INVENTION

Provided is a technique capable of appropriately setting regions that are displayed within an image capturing region respectively using different image categories, such as a region displayed using a color image, a region displayed using a monochrome image, and a region displayed using a composite color image.

One aspect of exemplary embodiments relates to an information processing apparatus, comprising, a first acceptance unit configured to accept designation of a first image category from among a plurality of image categories including a visible light image, an infrared light image, and a composite image based on the visible light image and the infrared light image, a second acceptance unit configured to accept designation of a second image category from among the plurality of image categories, the second image category being different from the first image category, a display control unit configured to display an image of the first image category accepted by the first acceptance unit in a display region of a display unit, and a region acceptance unit configured to accept designation of a region in the image of the first image category displayed in the display region, wherein the display control unit displays an image of the second image category accepted by the second acceptance unit in the region accepted by the region acceptance unit.

Further features of the present invention will become apparent from the following description of exemplary embodiments (with reference to the attached drawings).

BRIEF DESCRIPTION OF THE DRAWINGS

FIG. 1 is a diagram showing an exemplary configuration of a system corresponding to embodiments.

FIG. 3A is a diagram showing an example of a user interface (UI) that is displayed on a display unit 122 of the information processing apparatus 120 corresponding to an embodiment.

FIG. 3B is a diagram showing an example of a user interface (UI) that is displayed on the display unit 122 of the information processing apparatus 120 corresponding to an embodiment.

FIG. 3C is a diagram showing an example of a user interface (UI) that is displayed on the display unit 122 of the information processing apparatus 120 corresponding to an embodiment.

FIG. 3D is a diagram showing an example of a user interface (UI) that is displayed on the display unit 122 of the information processing apparatus 120 corresponding to an embodiment.

FIG. 6 is a flowchart showing an example of processing corresponding to a third embodiment.

FIG. 7 is a flowchart showing an example of processing corresponding to a fourth embodiment.

DESCRIPTION OF THE EMBODIMENTS

Figure 2A:
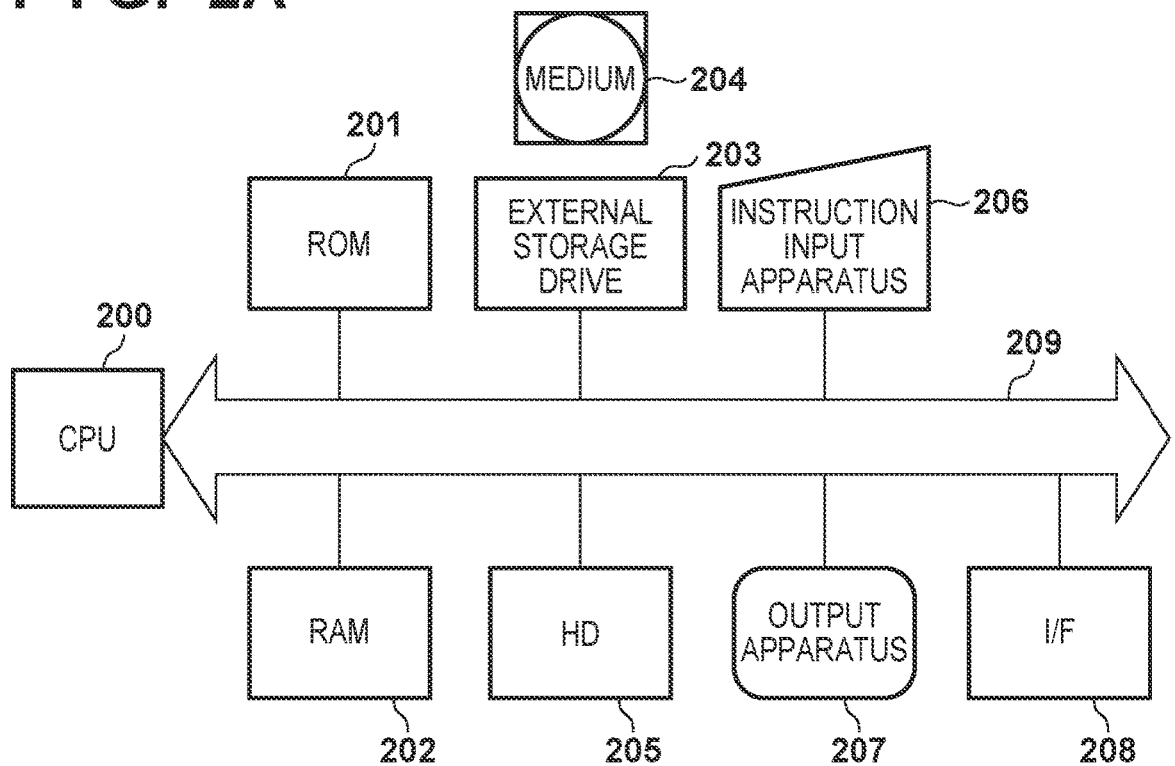
FIG. 2A is a diagram showing an exemplary hardware configuration of an information processing apparatus 120 corresponding to embodiments.

The following describes embodiments in detail based on the attached drawings.

First Embodiment

First, a configuration of a system according to a first embodiment will be described using a block diagram of FIG. 1. FIG. 1 is a block diagram showing an exemplary configuration of the system according to the first embodiment. In FIG. 1, a system 100 is composed of a shooting apparatus 110, an information processing apparatus 120, and a display apparatus 130 that are connected to one another via a network 140. The constituent elements of the system 100 shown in FIG. 1 are merely examples, and constituent elements other than these may be further added. Below, each constituent element will be described.

The shooting apparatus 110 can include an image capturing unit 111, a control unit 112, and a communication unit 113. The image capturing unit 111 can include an optical system, an image capturing sensor, a development processing unit, an encoding unit, and the like. For example, the image capturing unit 111 can not only obtain still images, but also obtain 30-fps moving images (a live video) of a monitored region by obtaining 30 frames worth of images per second. The image capturing unit 111 can be configured to include an image sensor for a color image and an image sensor for a monochrome image, and can output each of the color image and the monochrome image. Furthermore, the image capturing unit 111 can also generate a composite color image from the color image and the monochrome image and output the composite color image.

The control unit 112 adjusts shooting conditions of the shooting apparatus 110, such as an angle of view, a shooting direction, a frame rate, and a category of an image to be obtained. The adjustment of the shooting conditions can be executed in accordance with an instruction from a user, and can also be executed in accordance with setting values that have been stored in the shooting apparatus 110 in advance. When the user issues an instruction, the instruction may be issued from the information processing apparatus 120 or the display apparatus 130 via the network 140, or may be issued directly via a console terminal connected to the shooting apparatus 110 or an operation unit (not illustrated) included in the shooting apparatus 110. Furthermore, the control unit 112 controls the image capturing unit 111 in relation to, for example, the start/end of shooting in accordance with a command transmitted from the information processing apparatus 120 and the display apparatus 130.

The communication unit 113 is a communication interface for transmitting image data that has been generated by the image capturing unit 111 through shooting to the information processing apparatus 120 and the display apparatus 130 by way of the network 140. The communication unit 113 adjusts exchange of data with a communication partner using, for example, a network file system, such as an NFS and a CIFS, or a network communication protocol, such as a UDP and a TCP. The communication unit 113 also receives setting information and a command for controlling the shooting apparatus 110 from the information processing apparatus 120 and the display apparatus 130, and supplies them to the control unit 112. The control unit 112 controls the operations of the shooting apparatus 110 in conformity with these setting information and command.

The information processing apparatus 120 is configured to include a control unit 121, a display unit 122, a storage unit 123, a database (DB) management unit 124, a database (DB) 125, an operation unit 126, an image processing unit 127, and a communication unit 128. The control unit 121 controls the operations of each unit of the information processing apparatus 120. The display unit 122 can display user interfaces for displaying image data obtained from the shooting apparatus 110, which will be described later with reference to FIG. 3A to FIG. 3D. The display unit 122 may also have a function of performing audio output in addition to image output. The display unit 122 can be composed of a displaying apparatus, such as a display, and a display control unit that controls display on this displaying apparatus. Furthermore, the style of the display may be such that the display is positioned outside the information processing apparatus 120 and is connected to the information processing apparatus 120 for use.

The storage unit 123 stores image data received from the shooting apparatus 110, and stores information that is used for processing in the image processing unit 127 as well as the result of the processing. The operation unit 126 can accept operations from an operator of the information processing apparatus 120. Specifically, the operation unit 126 can accept operations for changing the settings of the shooting apparatus 110 and the information processing apparatus 120, and can include a keyboard, a mouse, various types of operation buttons, a touchscreen, and the like. The operations accepted by the information processing apparatus 120 include an operation on a pull-down menu and a button, designation and changing of a region, and the like using the user interfaces of FIG. 3A to FIG. 3D, which will be described later.

When a plurality of shooting apparatuses 110 are connected to the network 140, the operation unit 126 enables instructional input for displaying image data corresponding to the plurality of apparatuses on one screen on the display unit 122. It is also possible to perform instructional input for selecting one piece of image data on the screen and displaying this image data on the display unit 122. Furthermore, it is possible to perform instructional input for setting and changing various types of setting information.

The image processing unit 127 is a processing unit that executes image processing corresponding to the present embodiment. This image processing includes, for example, processing for generating a composite color image from a monochrome image and a color image, processing for generating an embedded image by extracting an image to be displayed in a region designated by a user from an image of a selected image category, and the like. Furthermore, processing for removing specific wavelength components with respect to a monochrome image and a color image received from the shooting apparatus 110 can also be performed. The generated monochrome image, color image, and composite color image can be stored into the DB 125 via the DB management unit 124 in association with various types of attribute information, such as the date and time of image capture and the location of image capture. The details of the functional configuration and operations of the image processing unit 127 will be described later.

The communication unit 128 receives image data transmitted from the shooting apparatus 110. The communication unit 128 can also transmit, to the shooting apparatus 110, setting information, control information, and a distribution command that have been set by a user of the information processing apparatus 120 using the display unit 122 and the operation unit 126. Furthermore, the communication unit 128 can output the result of processing of image data in the information processing apparatus 120 (including the aforementioned notifications) to the display apparatus 130 connected to the network 140.

The display apparatus 130 can display an image shot by the shooting apparatus 110, and can also output an image which has been received from the information processing apparatus 120 and with which an embedded image has been composited. Furthermore, the display apparatus 130 can also provide a user interface that is intended to issue an instruction for, or change, the shooting conditions and shooting parameters of shooting performed by the shooting apparatus 110, and can display a distributed video.

The network 140 is a collection of nodes and communication links that enables IP-based communication, such as a LAN and the Internet. In the network 140, a communication link of a necessary form is implemented in accordance with the intended use and purpose, whether the form is wired or wireless. The shooting apparatus 110 can shoot a live video in conformity with the designated shooting conditions, and distribute the obtained image data to each apparatus by way of the network 140.

The present embodiment is described based on a case where one shooting apparatus 110 is used; however, in the configuration of the system 100 shown in FIG. 1, the number of the shooting apparatus 110 can be any number equal to or larger than one, and there is no limitation on the number. In the information processing apparatus 120 and the display apparatus 130, each function may be realized by a plurality of apparatuses working in coordination with one another, rather than being realized by a single apparatus.

Next, a description is given of a schematic configuration of the information processing apparatus 120 that composes the system 100 corresponding to the present embodiment. FIG. 2A is a block diagram showing one example of a hardware configuration of the information processing apparatus 120. The above-described display apparatus 130 may also be configured to have a similar or equivalent hardware configuration.

In FIG. 2A, a CPU 200 can operate as the control unit 121, executes application programs, an operating system (OS), control programs, and the like that are stored in a hard disk apparatus (hereinafter referred to as an HD) 205, and performs control to temporarily store information, files, and the like that are necessary for the execution of programs into a RAM 202. Furthermore, the CPU 200 can also operate as the image processing unit 127, and executes processing for, for example, generating a composite color image from a monochrome image and a color image provided by the shooting apparatus 110. Moreover, the CPU 200 controls exchange of data with the external display apparatus 130 via an interface (I/F) 208. Note that processing of FIG. 4 to FIG. 7, which will be described later, can also be realized by controlling the entire apparatus through the execution of corresponding processing programs by the CPU 200.

A ROM 201 stores therein not only basic I/O programs, but also various types of data, such as application programs that execute predetermined processing. The RAM 202 temporarily stores various types of data, and functions as a main memory, a work area, and the like for the CPU 200. Also, the RAM 202 temporarily stores information received from the shooting apparatus 110. An external storage drive 203 is an external storage drive for realizing access to a recording medium, and it is possible to load programs and the like stored in a medium (recording medium) 204 into the present computer system. Note that, for example, a Floppy® disk (FD), a CD-ROM, a CD-R, a CD-RW, a PC card, a DVD, a Blu-ray®, an IC memory card, an MO, a memory stick, and the like can be used as the medium 204.

An HD (hard disk) that functions as a large-capacity memory is used as the hard disk apparatus 205 in the present embodiment. Application programs, an OS, control programs, associated programs, and the like are stored in the HD 205. Note that instead of the hard disk, a nonvolatile storage apparatus, such as a Flash® memory, may be used. The hard disk apparatus 205 can be configured to function as the database 125.

A keyboard, a pointing device (e.g., a mouse), a touchscreen, and the like are the equivalent of an instruction input apparatus 206. An output apparatus 207 outputs a command input from the instruction input apparatus 206, response output corresponding to this command, and the like. The output apparatus 207 can include a display, a speaker, a headphone terminal, and the like. A system bus 209 takes charge of the flow of data within the information processing apparatus 120.

The interface (hereinafter referred to as an I/F) 208 fulfills the role of mediating exchange of data with an external apparatus. Specifically, the I/F 208 can include a wireless communication module, and this module can include a known circuit mechanism that includes an antenna system, an RF transmitter/receiver, one or more amplifiers, a tuner, one or more oscillators, a digital signal processor, a CODEC chipset, a subscriber identification module card, a memory, and the like. The I/F 208 can also include a wired communication module for wired connection. The wired communication module enables communication with another device via one or more external ports. Furthermore, a variety of software components that process data can be included. The external ports are coupled to another device either directly via Ethernet, a USB, the IEEE 1394, and the like, or indirectly via a network. Note that configurations that replace hardware apparatuses can also be achieved using software that realizes functions equivalent to the respective apparatuses described above.

Each time a corresponding program is actuated to execute processing corresponding to the present embodiment, the program may be loaded from the HD 205, in which the program is already installed, into the RAM 202. Furthermore, programs according to the present embodiment can be recorded into the ROM 201, configured to compose a part of a memory map, and executed directly by the CPU 200. Moreover, a corresponding program and associated data can be loaded from the medium 204 directly into the RAM 202 and executed.

Figure 2B:
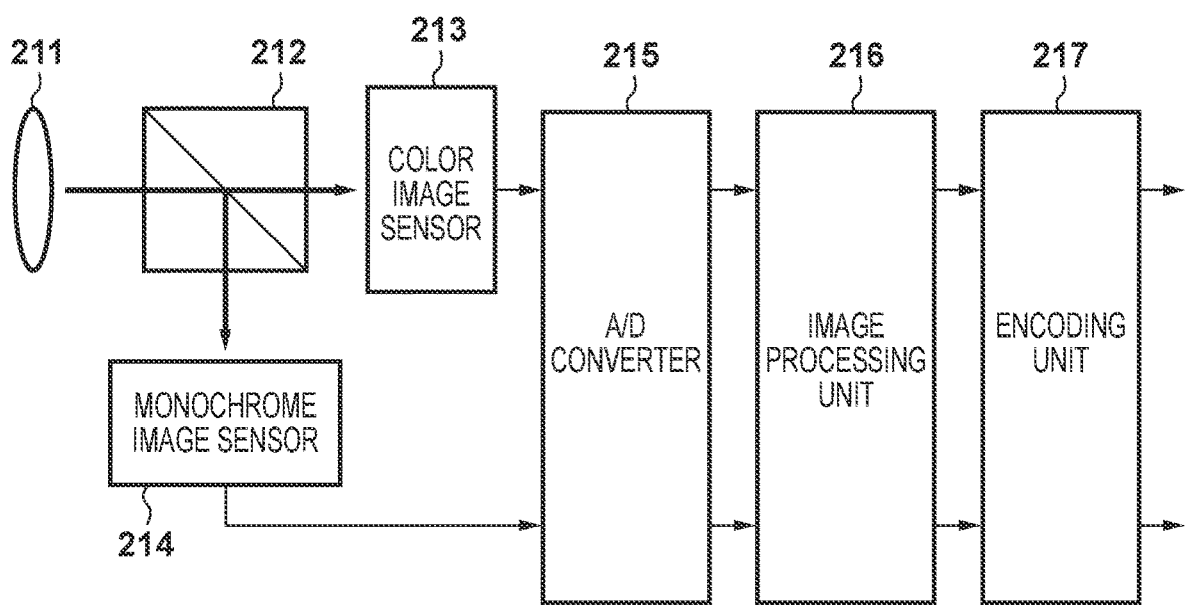
FIG. 2B is a diagram showing a functional configuration of a shooting apparatus 110.

Next, with reference to FIG. 2B, a description is given of a functional configuration of the image capturing unit 111 of the shooting apparatus 110 corresponding to the present embodiment. FIG. 2B is a block diagram showing an exemplary functional configuration of the image capturing unit 111 corresponding to the embodiment.

An optical system 211 adjusts a magnification and a point of focus, or a light amount, of a subject image that reaches the image capturing sensor. The optical system 211 includes a predetermined driving mechanism, such as a motor, for moving a lens, and the operations of this driving mechanism are controlled in accordance with an instruction from the control unit 112. A prism 212 divides light from the optical system 211; one of the divided light is incident on and photoelectrically converted in a color image sensor 213, whereas the other of the divided light is photoelectrically converted in a monochrome image sensor 214. Analog image signals obtained by photoelectrically converting light images that have been respectively formed on image capturing planes of the color image sensor 213 and the monochrome image sensor 214, are output to an A/D converter 215 and converted into digital image signals.

An image processing unit 216 can carry out, for example, development processing, such as debayer processing, white balance processing, and tone conversion processing, with respect to the digital image signals output from the A/D converter 215. The image processing unit 216 may also execute processing for removing specific wavelength components from a monochrome image and a color image, and processing for generating a composite color image from a monochrome image and a color image. An encoding unit 217 generates image data by compressing and encoding the digital image signals output from the development processing unit. An image compression method can be based on, for example, the standards of H.264, H.265, MJPEG, JPEG, and the like. Furthermore, image data of any format, including an mp4 or avi format, may be generated.

Next, a description is given of processing for generating a composite color image from a monochrome image and a color image in the present embodiment. This processing for generating the composite color image can be carried out in the image processing unit 127 or the image processing unit 216.

The color image sensor 213 shown in FIG. 2B is an image sensor in which color filters of red, green, and blue are positioned in front of light-receiving elements, and outputs a color image composed of red components, green components, and blue components. With the color image sensor 213, visible light can be captured without any waste. On the other hand, the monochrome image sensor 214 is an image sensor in which color filters are not positioned in front of light-receiving elements, and outputs monochrome image data composed of luminance information. As the monochrome image sensor 214 has high sensitivity and can also receive light with wavelength components that are longer in wavelength than visible light, it can capture images with a high spatial resolution.

As described above, the color image sensor 213 and the monochrome image sensor 214 differ in the wavelength band of received light. In view of this, in generating a composite color image, color information is extracted from a color image, and luminance information is extracted from monochrome image data, and image data is generated by compositing the color information and the luminance information; this makes it possible to obtain image data with which a subject image is vividly displayed by taking advantage of such a band difference.

When a color image includes wavelength components outside a visible light range, such as infrared light components, the image processing unit 127 and the image processing unit 216 may remove the wavelength components outside the visible light range and generate a color image composed only of wavelength components within the visible light range. By thus removing wavelength components such as infrared light components, a color image that is easily comprehensible for human eyes and matches human perception can be obtained. Furthermore, when a monochrome image includes wavelength components within the visible light range, the image processing unit 127 and the image processing unit 216 can remove the wavelength components within the visible light range, thereby making the monochrome image composed only of wavelength components outside the visible light range. By thus removing the visible light components, a monochrome image that vividly shows a subject can be obtained, even in an environment with poor visibility due to fog, haze, and the like. In this case, the image processing unit 127 and the image processing unit 216 can generate a composite color image by compositing color information extracted from a color image that is composed only of wavelength components within the visible light range, and luminance information extracted from a monochrome image that is composed only of wavelength components outside the visible light range.

In the present embodiment, it is assumed that a monochrome image, a color image, and a composite color image have the same size (number of pixels in the vertical and horizontal directions). Therefore, coordinate information of a region that has been designated in a certain image can be used as coordinate information for extracting a corresponding region in another image.

Hereinafter, the present embodiment will be described based on a case where the shooting apparatus 110 transmits a monochrome image and a color image to the information processing apparatus 120, and the information processing apparatus 120 side generates a composite color image. However, the following description about the embodiment is similarly applicable to a case where the shooting apparatus 110 side generates a composite color image and the shooting apparatus 110 transmits images of three image categories, namely a monochrome image, a color image, and the composite color image, to the information processing apparatus 120.

Figure 4:
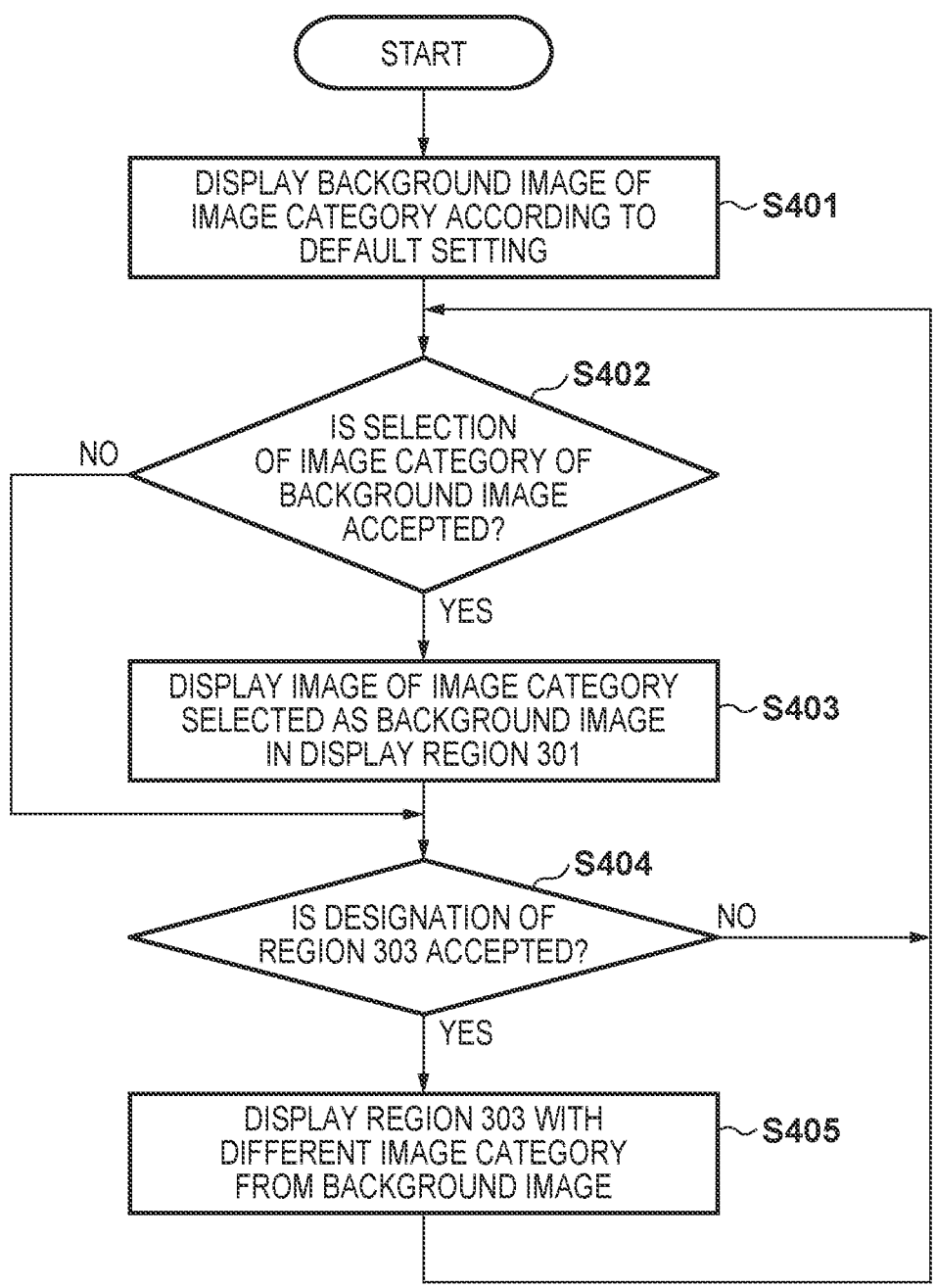
FIG. 4 is a flowchart showing an example of processing corresponding to a first embodiment.

Next, processing corresponding to the present embodiment will be described with reference to FIG. 3A and FIG. 4. First, FIG. 3A shows an example of a user interface (UI) that is displayed on the display unit 122 of the information processing apparatus 120. In an example of a display screen 300 shown in FIG. 3A, an image based on a captured image that has been captured by the shooting apparatus 110 is displayed in a display region 301 for displaying a background image, and a pull-down menu 302 is displayed above this display region 301. The pull-down menu 302 includes image categories of "monochrome image" and "composite color image" as selection elements for the background image displayed in the display region 301, and allows for selection of one of them. Although the present embodiment is described using two image categories (types) of "monochrome image" and "composite color image" as examples, "color image" may be further selectable. Also, one of "monochrome image" and "composite color image", as well as "color image", may be selectable.

The pull-down menu 302 may be configured so that, for example, a monochrome image (or a composite color image) is selected as a default setting. Also, a region 303 enclosed by a dashed line is a region designated by a user. This region can be designated by, for example, the user operating an on-screen cursor displayed on the display unit 122 using the mouse of the operation unit 126.

Next, the flow of processing in the information processing apparatus 120 corresponding to the present embodiment will be described with reference to a flowchart of FIG. 4. The processing corresponding to this flowchart can be realized by, for example, one or more processors (e.g., the CPU 200) that function as respective processing units executing a corresponding program (stored in the ROM 201, HD 205, and the like).

First, in step S401, the control unit 121 displays a default background image in the display region 301 within the display screen 300 of the display unit 122. The default background image can be, for example, a monochrome image. In the next step S402, the control unit 121 determines whether selection of an image category of the background image has been accepted from the user. Using the pull-down menu 302 of the display screen 300, the user can select one of a monochrome image and a composite color image. If it is determined that the selection by the user has been accepted in step S402, the processing proceeds to step S403. On the other hand, if the selection by the user has not been accepted, the processing proceeds to step S404.

In step S403, the control unit 121 displays an image of the image category that was selected in step S402 in the display region 301 of the display screen 300. For example, when the selected image category of the background image is a composite color image, a composite color image is displayed in the display region 301. In the next step S404, the control unit 121 determines whether designation of the region 303 within the display region 301 has been accepted from the user. If the control unit 121 determines that the region has been accepted, the processing proceeds to step S405. If the control unit 121 determines that the designation of the region has not been accepted, the processing returns to step S402.

In step S405, the control unit 121 extracts an image to be displayed in the region 303 that was designated in step S404 from an image that is different in image category from the image that has been selected using the pull-down menu 302, and displays the extracted image as an embedded image (or a superimposed image, a switchover image) in the region 303. For example, when a monochrome image is displayed as the background image in the display region 301, a composite color image is displayed in the region 303; when a composite color image is displayed as the background image, a monochrome image is displayed in the region 303. Here, as a monochrome image and a composite color image to be displayed have the same size (number of pixels in the vertical and horizontal directions) in the present embodiment as stated earlier, the position of an image to be extracted from a composite color image can be determined based on the coordinates of the region designated in a monochrome image.

In this way, in an image displayed as a background image, an arbitrarily designated region can be presented using a different image category. For example, according to the present embodiment, when a captured image obtained by capturing a vehicle parked in a parking lot is to be checked on the display screen 300, a composite color image can be used as the background image, and a region showing a license plate can be designated as the region 303 and displayed as a monochrome image. In this way, while the color of the vehicle is checked using the composite color image, the monochrome image with excellent signal-to-noise is used for a portion of the license plate, thereby increasing the visibility of the numbers.

In the foregoing description, the user can switch the image category of the background image using the pull-down menu 302 after designating the region 303, in which case the image category displayed in the region 303 is also switched in response to the switching of the image category of the background image.

Furthermore, although the above has described a case where the user can designate one region 303 within the display region 301, two or more regions 303 may be settable. Moreover, the shape of the region is not only a rectangular shape, and can be any shape including a circular shape, an elliptic shape, a polygonal shape, and the like. In addition, a plurality of regions having different shapes, sizes, and frame colors can be designated with respect to the same background image.

Furthermore, although the foregoing description has presented a case where a background image of an image category according to a default setting is displayed before accepting selection by the user with regard to the background image, the display of the background image may be started in response to selection of an image category of the background image by the user. In addition, the content of the setting selected at the time of completion of previous processing may be stored, and this setting may be used as a default setting; alternatively, the user may be able to configure a default setting in advance.

Furthermore, a region that has been set on a background image can be deleted from the image in accordance with a predetermined operation. As a result of the deletion operation, the original background image is displayed in a portion corresponding to this region.

As described above, in the present embodiment, an image that is different in image category from a background image can be displayed in an embedded state (or a superimposed state, a partially switched state) by designating an arbitrary region in the background image. In this way, better visibility can be achieved by switching an image category on a per-region basis in accordance with a subject included in one image.

Second Embodiment

Next, a second embodiment will be described. A configuration of a system 100 according to the present embodiment is similar to that shown in FIG. 1, FIG. 2A, and FIG. 2B. The above first embodiment has been described based on a case where selectable images come in two image categories (types), a monochrome image and a composite color image; in the present embodiment, a color image is also selectable in addition to these. The present embodiment may be implemented in combination with the first embodiment, or may be implemented alone.

FIG. 3B shows an example of a user interface (UI) that is displayed on the display unit 122 of the information processing apparatus 120 corresponding to the present embodiment. In an example of a display screen 310 shown in FIG. 3B, an image based on a captured image that has been captured by the shooting apparatus 110 is displayed in a display region 311 for displaying a background image, and a pull-down menu 312 for selecting the background image and a pull-down menu 314 for selecting an embedded image are displayed above this display region 311. Also, a region 313 enclosed by a dashed line is a region designated by a user. This region can be designated by, for example, the user operating an on-screen cursor displayed on the display unit 122 using the mouse of the operation unit 126.

The pull-down menu 312 includes "monochrome image", "composite color image", and "color image" as selection elements for the background image displayed in the display region 311, and allows for selection of one of them. On the other hand, the pull-down menu 314 allows for selection of an image category of the embedded image from among image categories other than the image category that has been selected using the pull-down menu 312. For example, when "monochrome image" has been selected as the background image, only one of "composite color image" and "color image" can be selected using the pull-down menu 314.

Figure 5:
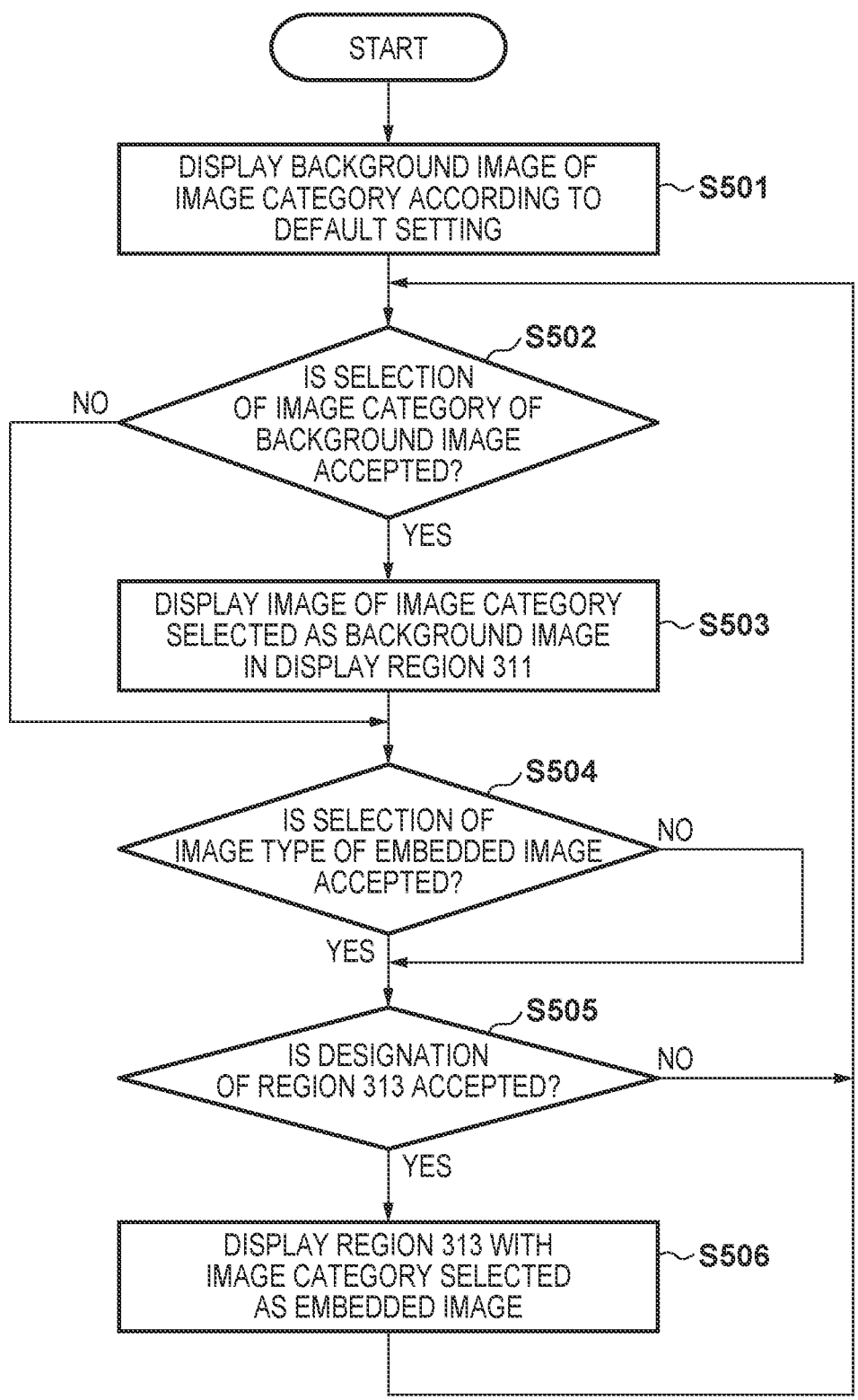
FIG. 5 is a flowchart showing an example of processing corresponding to a second embodiment.

Next, the flow of processing in the information processing apparatus 120 corresponding to the present embodiment will be described with reference to a flowchart of FIG. 5. The processing corresponding to this flowchart can be realized by, for example, one or more processors (e.g., the CPU 200) that function as respective processing units executing a corresponding program (stored in the ROM 201, HD 205, and the like).

First, in step S501, the control unit 121 displays a default background image in the display region 311 within the display screen 310 of the display unit 122. The default background image can be, for example, a monochrome image. In the next step S502, the control unit 121 determines whether selection of an image category of the background image has been accepted from the user. Using the pull-down menu 312 of the display screen 310, the user can select one of a monochrome image, a composite color image, and a color image. If it is determined that the selection by the user has been accepted in step S502, the processing proceeds to step S503. On the other hand, if the selection by the user has not been accepted, the processing proceeds to step S504.

In step S503, the control unit 121 displays an image of the image category that was selected in step S502 in the display region 311 of the display screen 310. For example, when the selected image category of the background image is a composite color image, a composite color image is displayed in the display region 311. In the next step S504, the control unit 121 determines whether selection of an image category of an embedded image has been accepted from the user. At this time, the image category that was selected using the pull-down menu 312 is excluded from the image categories that can be selected using the pull-down menu 314. As a default setting can be prepared also with respect to the image categories of the embedded image, the default setting is used as is when the selection by the user is not accepted. The default setting can be one of the image categories other than the image category being selected as the background image. After the determination of step S504, the processing proceeds to step S505.

In step S505, the control unit 121 determines whether designation of the region 313 within the display region 311 has been accepted from the user. If the control unit 121 determines that the designation of the region has been accepted, the processing proceeds to step S506. If the control unit 121 determines that the designation of the region has not been accepted, the processing returns to step S502. In step S506, the control unit 121 extracts an image to be displayed in the region 313 that was designated in step S505 from an image of the image category that has been selected using the pull-down menu 314, and displays the extracted image in the region 313. For example, when a monochrome image has been selected as the embedded image, a monochrome image is displayed in the region 313.

In the foregoing description, after the user has designated the region 313, the user can switch the image category of the embedded image using the pull-down menu 314, which is displayed in relation to this region, and also switch the image category of the background image using the pull-down menu 312.

Furthermore, although the above has described a case where the user can designate one region 313 within the display region 311, two or more regions 313 may be settable. Moreover, the shape of the region is not only a rectangular shape, and can be any shape including a circular shape, an elliptic shape, a polygonal shape, and the like. In addition, a plurality of regions having different shapes, sizes, and frame colors can be designated with respect to the same background image. In the present embodiment, the pull-down menu 314 allows for designation and switching of an image category collectively for embedded images that are displayed in connection with a plurality of regions 313. Furthermore, a region that has been set on a background image can be deleted from the image in accordance with a predetermined operation. As a result of the deletion operation, the original background image is displayed in a portion corresponding to this region.

Furthermore, although the foregoing description has presented a case where images of image categories according to default settings are displayed before accepting selection by the user with regard to the background image and the embedded image, the display of the respective images may be started in response to selection of image categories by the user. In this case, step S505 may be executed prior to step S504. In addition, the contents of the respective settings selected at the time of completion of previous processing may be stored, and these settings may be used as default settings; alternatively, the user may be able to configure default settings in advance.

As described above, in the present embodiment, the user can designate each of the image categories of a background image and an embedded image; thus, the user can select the image categories in accordance with a subject included in a captured image, thereby achieving better visibility.

Third Embodiment

Next, a third embodiment will be described. A configuration of a system 100 according to the present embodiment is similar to that shown in FIG. 1, FIG. 2A, and FIG. 2B. In the above-described second embodiment, an image category is designated collectively for embedded images using the pull-down menu 314; in the present embodiment, an image category is selectable for each region that has been set. The present embodiment may be implemented in combination with the first embodiment and/or the second embodiment, or may be implemented alone.

FIG. 3C shows an example of a user interface (UI) that is displayed on the display unit 122 of the information processing apparatus 120 corresponding to the present embodiment. In an example of a display screen 320 shown in FIG. 3C, an image based on a captured image that has been captured by the shooting apparatus 110 is displayed in a display region 321 for displaying a background image, and a pull-down menu 322 for selecting the background image is displayed above this display region 321. Also, regions 323, 325 enclosed by a dashed line are regions designated by a user. These regions can be designated by, for example, the user operating an on-screen cursor displayed on the display unit 122 using the mouse of the operation unit 126. Pull-down menus 324, 326 are displayed in association with the respective regions, and each pull-down menu allows for selection of an image category of a corresponding embedded image.

The pull-down menu 322 includes "monochrome image", "composite color image", and "color image" as selection elements for the background image displayed in the display region 321, and allows for selection of one of them. On the other hand, the pull-down menus 324, 326 allow for selection of an image category of the embedded image from among image categories other than the image category that has been selected using the pull-down menu 322. For example, when "monochrome image" has been selected as the background image, only one of "composite color image" and "color image" can be selected using the pull-down menus 324, 326.

Next, the flow of processing in the information processing apparatus 120 corresponding to the present embodiment will be described with reference to a flowchart of FIG. 6. The processing corresponding to this flowchart can be realized by, for example, one or more processors (e.g., the CPU 200) that function as respective processing units executing a corresponding program (stored in the ROM 201, HD 205, and the like).

First, in step S601, the control unit 121 displays a default background image in the display region 321 within the display screen 320 of the display unit 122. The default background image can be, for example, a monochrome image. In the next step S602, the control unit 121 determines whether selection of an image category of the background image has been accepted from the user. Using the pull-down menu 322 of the display screen 320, the user can select one of a monochrome image, a composite color image, and a color image. If it is determined that the selection by the user has been accepted in step S602, the processing proceeds to step S603. On the other hand, if the selection by the user has not been accepted, the processing proceeds to step S604.

In step S603, the control unit 121 displays an image of the image category that was selected in step S602 in the display region 321 of the display screen 320. For example, when the selected image category of the background image is a composite color image, a composite color image is displayed in the display region 321. In the next step S604, the control unit 121 determines whether designation of a region within the display region 321 has been accepted from the user. If the control unit 121 determines that the designation of the region has been accepted, the processing proceeds to step S605. If the control unit 121 determines that the designation of the region has not been accepted, the processing returns to step S602. In step S605, the control unit 121 displays a pull-down menu for an embedded image near the designated region. For example, when the designation of the region 323 has been accepted, the pull-down menu 324 is displayed.

At this time, a position that has been determined in advance in connection with the designated region can be used as the display position of the pull-down menu for the embedded image. For example, when the region has a rectangular shape, the display position may be near a lower edge. Alternatively, the display position may be near an upper edge. Furthermore, the display position may be determined based on an image feature around the designated region. For example, the region 323 is set so as to surround a part of an automobile. At this time, an upper portion of the region 323 does not include the automobile, but a lower portion thereof includes the remaining portion of the automobile; thus, although many high-frequency components are detected from the lower portion, few high-frequency components are detected from the upper portion. In view of this, by displaying the pull-down menu at the upper portion that includes a small amount of information as an image, a subject included in the background image can be prevented from getting hidden by the pull-down menu, and the visibility is not impaired.

Furthermore, the display position of the pull-down menu may be moved within the display region 321 in accordance with a changing instruction from the user using the operation unit 126. In this way, the pull-down menu can be displayed at a position desired by the user. In addition, after the pull-down menu is displayed for a certain period following the designation of the region, the pull-down menu may be deleted from within the display screen 320. Even after the display has been deleted, the pull-down menu may be displayed again when a region is selected again using the cursor.

In the next step S606, the control unit 121 determines whether selection of an image category of the embedded image has been accepted from the user using the displayed pull-down menu for the embedded image. At this time, the image category that was selected using the pull-down menu 322 for the background image is excluded from the image categories that can be selected using the pull-down menu for the embedded image. As a default setting can be prepared also with respect to the image categories of the embedded image, the default setting is used as is when the selection by the user is not accepted. The default setting can be one of the image categories other than the image category being selected as the background image. After the determination of step S606, the processing proceeds to step S607.

In step S607, the control unit 121 extracts an image to be displayed in the region that was designated in step S605 from an image of the image category that has been selected using the pull-down menu for the embedded image, and displays the extracted image in the region 323. For example, when a color image has been selected as the embedded image, a color image is displayed in the region.

In the present embodiment also, the shape of the designatable region is not only a rectangular shape, and can be any shape including a circular shape, an elliptic shape, a polygonal shape, and the like. In addition, a plurality of regions having different shapes, sizes, and frame colors can be designated with respect to the same background image.

As described above, in the present embodiment, the user can designate an image category of an embedded image for each designated region; thus, the user can select image categories in accordance with subjects included in a captured image, thereby achieving better visibility.

According to the present embodiment, even when there is a possibility that significant brightness difference arises in one captured image, an image of an appropriate image category can be designated on a per-region basis as shown in FIG. 3C. FIG. 3C shows one example of an image captured at night; here, a subject that is present in a range reached by a street light can be displayed using a color image as it is easily recognized due to the bright surrounding, whereas a subject that is not reached by the street light and is surrounded by darkness can be displayed using a composite color image. In this way, image categories corresponding to the image capturing conditions of subjects can be selected within one image.

Fourth Embodiment

Next, a fourth embodiment will be described. A configuration of a system 100 according to the present embodiment is similar to that shown in FIG. 1, FIG. 2A, and FIG. 2B. In the second and third embodiments described above, the image category of an embedded image is designated using a pull-down menu; in the present embodiment, the image category is selectable using a button. The present embodiment may be implemented in combination with at least one of the first to third embodiments, or may be implemented alone.

FIG. 3D shows an example of a user interface (UI) that is displayed on the display unit 122 of the information processing apparatus 120 corresponding to the present embodiment. In an example of a display screen 330 shown in FIG. 3D, an image based on a captured image that has been captured by the shooting apparatus 110 is displayed in a display region 331 for displaying a background image, and a pull-down menu 332 for selecting the background image is displayed above this display region 331. Also, regions 333, 334 are regions designated by a user. These regions can be designated by, for example, the user operating an on-screen cursor displayed on the display unit 122 using the mouse of the operation unit 126.

The display screen 330 further includes buttons 335 to 337 as selection elements. A color display button 335 is a button that displays characters, an illustration, or an image that explicitly indicates a color image. A composite color display button 336 is a button that displays characters, an illustration, or an image that explicitly indicates a composite color image. A monochrome display button 337 is a button that displays characters, an illustration, or an image that explicitly indicates a monochrome image. In the present embodiment, the image category of an embedded image can be selected by individually selecting one of the buttons 335 to 337, which are the selection elements, instead of a pull-down menu for the embedded image.

Next, the flow of processing in the information processing apparatus 120 corresponding to the present embodiment will be described with reference to a flowchart of FIG. 7. The processing corresponding to this flowchart can be realized by, for example, one or more processors (e.g., the CPU 200) that function as respective processing units executing a corresponding program (stored in the ROM 201, HD 205, and the like).

First, in step S701, the control unit 121 displays a default background image in the display region 331 within the display screen 330 of the display unit 122. The default background image can be, for example, a monochrome image. In the next step S702, the control unit 121 determines whether selection of an image category of the background image has been accepted from the user. Using the pull-down menu 332 of the display screen 330, the user can select one of a monochrome image, a composite color image, and a color image. If it is determined that the selection by the user has been accepted in step S702, the processing proceeds to step S703. On the other hand, if the selection by the user has not been accepted, the processing proceeds to step S704.

In step S703, the control unit 121 displays an image of the image category that was selected in step S702 in the display region 331 of the display screen 330. For example, when the selected image category of the background image is a composite color image, a composite color image is displayed in the display region 331. In the next step S704, the control unit 121 determines whether individual selection of one of the buttons 335 to 336 within the display screen 330 has been accepted from the user. If the control unit 121 determines that the selection of one of the buttons has been accepted, the processing proceeds to step S705. On the other hand, if the control unit 121 determines that the button selection has not been accepted (including a case where the selection of one of the buttons has already been accepted and that selection has not been changed), the processing proceeds to step S706. In accepting the button selection in step S704, the control unit 121 may, for example, gray out or hide a button corresponding to the image category that has been selected as the image category of the background image, or accept no click operations from the user, so as to render the button unselectable by the user.

In step S705, based on the image category of the button currently selected, the control unit 121 determines the image category that will be displayed in a designated region if the designation of the region is accepted in step S706 of a later stage. For example, if the color display button 335 was selected in step S704, the category of an embedded image to be displayed in the region designated in step S706 of the later stage is a color image.

In the next step S706, the control unit 121 determines whether designation of a region within the display region 331 has been accepted from the user. If the control unit 121 determines that the designation of the region has been accepted, the processing proceeds to step S707. If the control unit 121 determines that the designation of the region has not been accepted, the processing returns to step S702. In accepting the designation of the region, display of the region rendered on the display region 331, such as the color of a frame line and the category of the line, may be visually associated with a display mode of the selected button. In FIG. 3D, the color display button 335 is depicted using a solid frame line, and a frame line of the corresponding region 334 is also depicted using a solid line. On the other hand, the composite color display button 336 is depicted using a dash frame line, and a frame line of the corresponding region 333 is also depicted using a dashed line. In this way, the category of an image to be displayed in the designated region can be checked immediately by referring to the display styles of the buttons. There are cases where, depending on a subject or image capturing conditions, which one of a color image, a composite color image, and a monochrome image is displayed is difficult to understand at first glance; therefore, by displaying a frame line in the foregoing manner, the user can be notified of an image category in a visually easy-to-understand manner.

In step S707, the control unit 121 extracts an image of the image category that was determined in step S705, and displays the extracted image in the region that was designated in step S706. For example, if the color display button 335 was selected in step S704, a color image is displayed in the region. Thereafter, the processing returns to step S702.

The above has described a case where a region is designated after selecting a button; however, with regard to a region that has been set once, a displayed image category can also be changed by switching the selected button. For instance, in the example of FIG. 3D, selecting the region 333 on the display screen 330 using the cursor will show the composite color display button 336 in a selected state; at this time, by selecting the color display button 335, the image category of an embedded image displayed in the region 333 can be changed from a composite color image to a color image. In this way, with regard to a region that has been designated after selecting an image category in advance, the image category can be changed even after the designation of the region.

As described above, in the present embodiment, a region in which an embedded image is to be displayed can be designated after selecting the image category of the embedded image; thus, the user can select the image category in accordance with a subject included in a captured image, thereby achieving better visibility.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-198706, filed on Oct. 22, 2018, which is hereby incorporated by reference herein in its entirety.

What is claimed is:
1. An information processing apparatus, comprising:
one or more processors; and at least one memory coupled to the one or more processors and having stored thereon instructions, which when executed by the one or more processors, cause the information processing apparatus to function as:
- a first acceptance unit configured to accept designation of a first image type from among a plurality of image types consisting of at least two of a visible light image, an infrared light image, and a composite image based on the visible light image and the infrared light image;
- a second acceptance unit configured to accept designation of a second image type from among the plurality of image types, the second image type being different from the first image type;
- a display control unit configured to display an image of the first image type accepted by the first acceptance unit in a display region of a display unit; and
- a region acceptance unit configured to accept designation of a region in the image of the first image type displayed in the display region, wherein the display control unit displays an image of the second image type accepted by the second acceptance unit in the region accepted by the region acceptance unit.

2. The information processing apparatus according to claim 1, wherein
the second acceptance unit further configured to accept an image type collectively for a plurality of regions that are designated through the region acceptance unit.

3. The information processing apparatus according to claim 1, wherein
the second acceptance unit accepts designation of the second image type using a plurality of selection elements that respectively correspond to the plurality of image types.

4. The information processing apparatus according to claim 3, wherein
the second acceptance unit accepts selection through a pull-down menu that includes the plurality of selection elements.

5. The information processing apparatus according to claim 3, wherein
the second acceptance unit accepts selection through individually-selectable buttons that correspond to the plurality of selection elements.

6. The information processing apparatus according to claim 5,
wherein the display control unit displays a button corresponding to the second image type whose designation has been accepted, and the region in which the image of the second image type is displayed, in a visually associated manner.

7. The information processing apparatus according to claim 1,
wherein when the region acceptance unit has accepted designation of a plurality of regions, the second acceptance unit accepts image types respectively for the plurality of regions on an individual basis.

8. The information processing apparatus according to claim 7,
wherein the second acceptance unit accepts designation of the second image type using a plurality of selection elements that respectively correspond to the plurality of image types.

9. The information processing apparatus according to claim 8, wherein
the second acceptance unit accepts selection through pull-down menus that are respectively associated with the plurality of regions and include the plurality of selection elements.

10. The information processing apparatus according to claim 9,
wherein the display control unit displays the pull-down menus near the plurality of regions.

11. The information processing apparatus according to claim 10, wherein
the display control unit changes a display position of the pull-down menu in accordance with an instruction for changing the display position of the pull-down menu.

12. The information processing apparatus according to claim 1, wherein
the plurality of image types include at least two of a color image, a monochrome image, and a composite color image obtained by compositing the color image and the monochrome image.

13. The information processing apparatus according to claim 1, wherein the instructions, when executed by the one or more processors, further cause the information processing apparatus to function as:
- an obtaining unit configured to obtain images that are respectively of the plurality of image types, and
wherein the obtained images have the same size regardless of the plurality of image types.

14. A control method for an information processing apparatus, comprising:
- accepting designation of a first image type from among a plurality of image types consisting of at least two of a visible light image, an infrared light image, and a composite image based on the visible light image and the infrared light image;
- accepting designation of a second image type from among the plurality of image types, the second image type being different from the first image type;
- displaying an image of the accepted first image type in a display region of a display unit; and
- accepting designation of a region in the image of the accepted first image type displayed in the display region,
wherein in the displaying, an image of the accepted second image type is displayed in the region accepted in the accepting of the designation of the region.

15. A non-transitory computer-readable medium storing a program for causing a computer to execute a method comprising:
- accepting designation of a first image type from among a plurality of image types consisting of at least two of a visible light image, an infrared light image, and a composite image based on the visible light image and the infrared light image;
- accepting designation of a second image type from among the plurality of image types, the second image type being different from the first image type;
- displaying an image of the accepted first image type in a display region of a display unit; and
- accepting designation of a region in the image of the accepted first image type displayed in the display region,
wherein in the displaying, an image of the accepted second image type is displayed in the region accepted in the accepting of the designation of the region.

* * * * *